United States Patent [19]
Takeda et al.

[11] Patent Number: 5,677,858
[45] Date of Patent: Oct. 14, 1997

[54] AUDIO RATE CONVERTER

[75] Inventors: Takayuki Takeda, Kanagawa; Atsumu Soda, Tokyo; Jeremy Brayley, Kanagawa, all of Japan

[73] Assignee: Sony Corporation, Tokyo, Japan

[21] Appl. No.: 405,157

[22] Filed: Mar. 16, 1995

[30]   Foreign Application Priority Data

Mar. 17, 1994  [JP]  Japan .................................. 6-047421

[51] Int. Cl.$^6$ ..................................................... G06F 17/17
[52] U.S. Cl. ................................................................ 364/724.1
[58] Field of Search ........................... 364/724.1, 724.01, 364/718

[56]                    References Cited

U.S. PATENT DOCUMENTS

| 3,673,399 | 6/1972 | Hancke et al. | 364/726 |
| 4,394,774 | 7/1983 | Widergren et al. | 382/250 |
| 5,475,682 | 12/1995 | Adams et al. | 364/724.1 |
| 5,481,487 | 1/1996 | Jang et al. | 364/725 |

Primary Examiner—Reba L. Elmore
Assistant Examiner—Emmanuel L. Moise
Attorney, Agent, or Firm—William S. Frommer; Alvin Sinderbrand

[57]   ABSTRACT

An audio rate converter converts a sampling rate for audio data into a fixed rate. In the audio rate converter, an input audio data DAin at a sampling rate of PFS (48 kHz±x%) are stored in the memory in accordance with a write address WAD which is synchronized with the rate PFS. Audio data are read from the memory in accordance with a read address RAD which is synchronized with a rate FS (48 kHz), and coefficient data determined based on a sampling point in output audio data are read from a ROM table in accordance with a read address Coef.AD which is synchronized with the rate FS. A data arithmetic and logic circuit performs multiplying and adding operations using these data in order to produce the output audio data DAout. If the sampling rate PFS at which the input audio data are provided changes, the audio rate converter can provide the output audio data DAout at the fixed sampling rate FS.

3 Claims, 6 Drawing Sheets

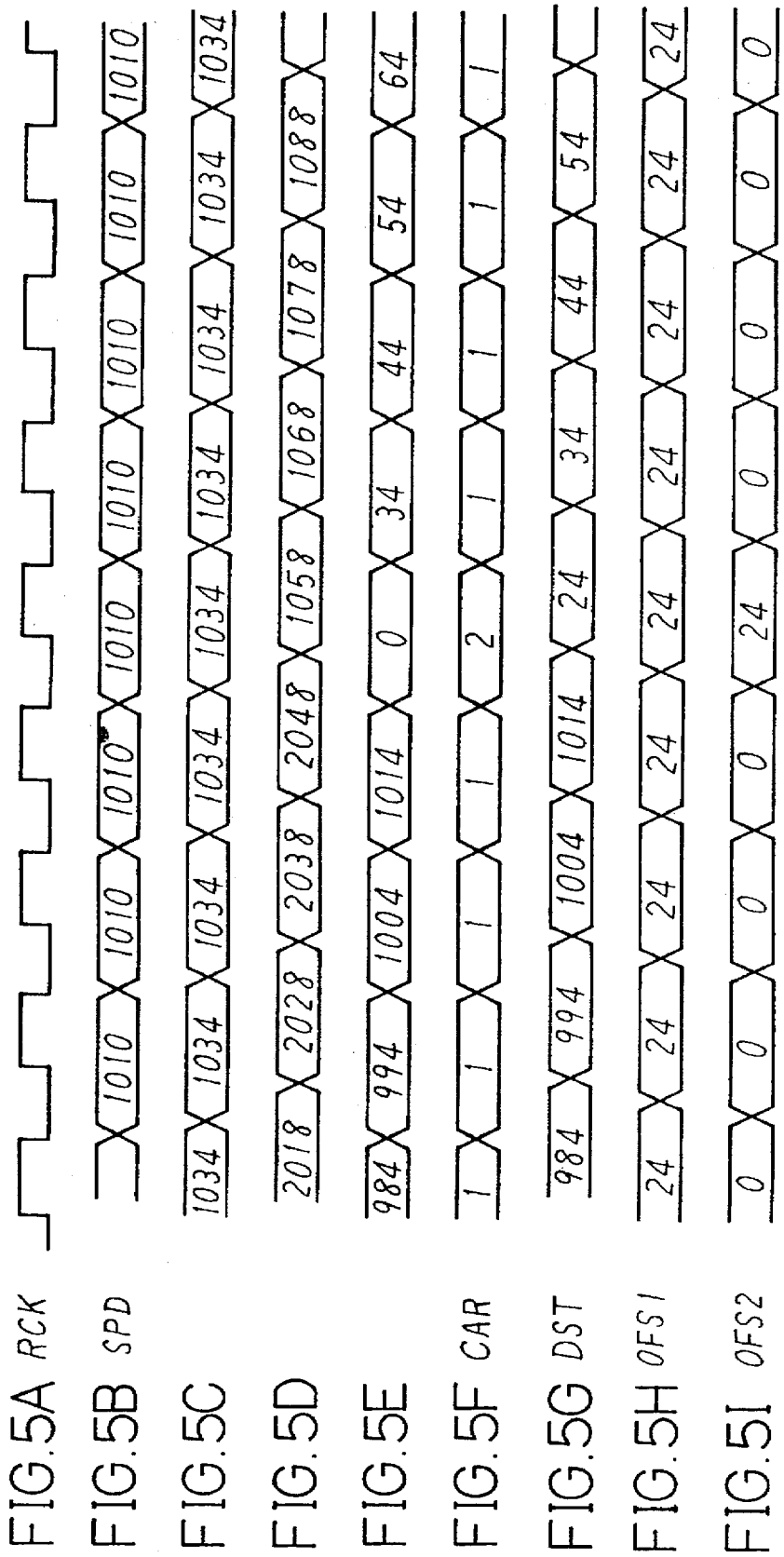

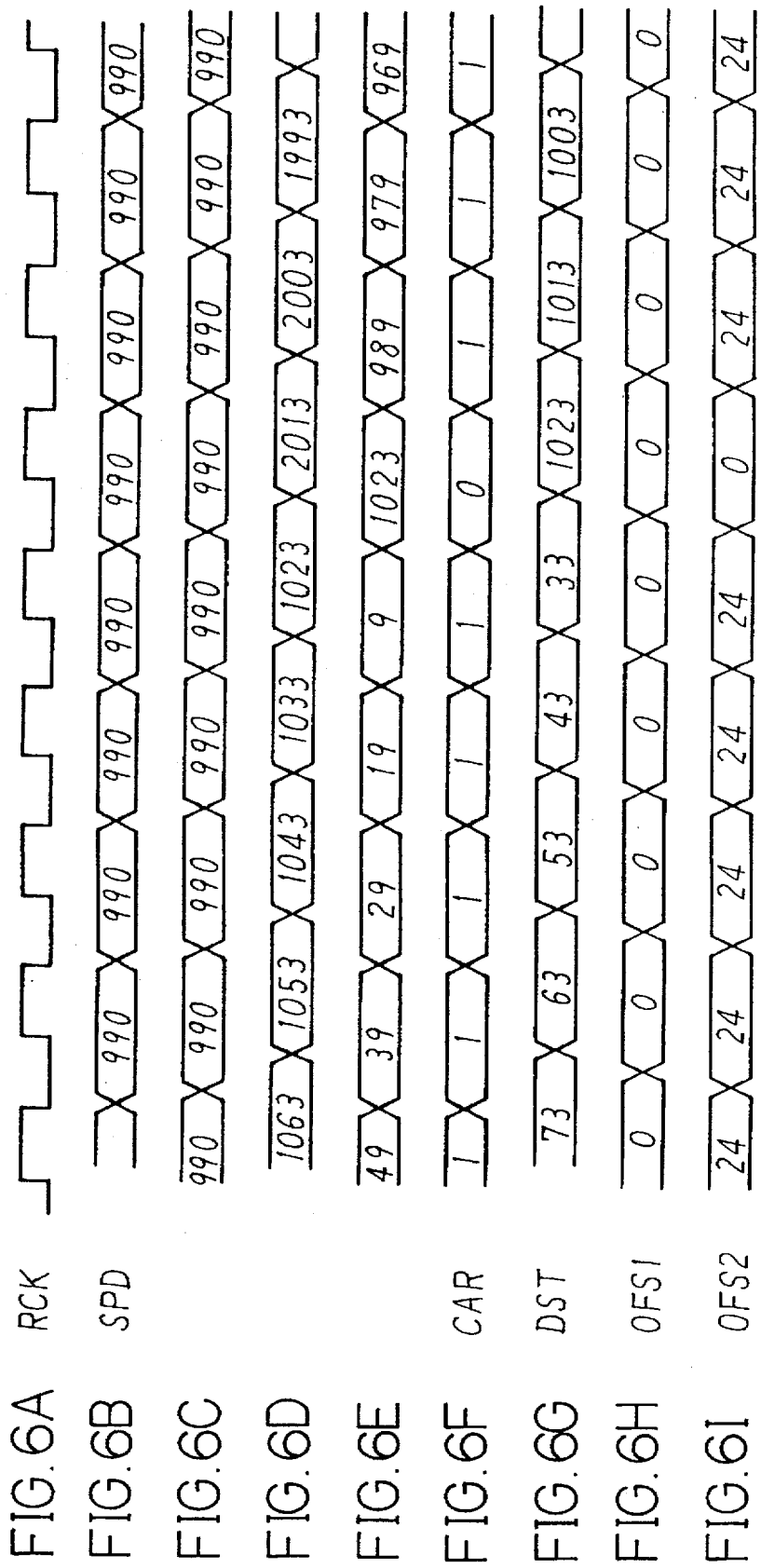

AUDIO RATE CONVERTER

BACKGROUND OF THE INVENTION

This invention relates to an audio rate converter for converting a sampling rate for audio data into a fixed rate.

As is disclosed in Japanese Patent Application Examined Publication No. 67794/1988, VTRs (video tape recorders) currently in use can perform a programmed play in order to precisely expand the length of time of a program recorded on tape when playing back the program. The audio playback system is operated such that the program rate of the audio playback is matched to the programmed rate when the digital VTR is playing back a tape as described above.

When operating the audio playback system when it is matched to the program rate as described above, the sampling rate of the audio data diverges from the normal rate to the extent of its degree of expansion. For example, when the normal rate is 48 kHz, the sampling rate at which the audio data are played back during programmed play is 48 kHz±x% ("±x%" is the portion of fluctuation). In this case, since an AES/EBU (Audio Engineering Society/European Broadcasting Union) format or a SIF (serial interface) can not ensure transmission at the rate of 48 kHz, a mute signal at 48 kHz is outputted instead of the playback audio data. In other words, it is impossible to transmit the playback audio data using the AES/EBU format or the SIF.

SUMMARY OF THE INVENTION

It is accordingly an object of the present invention to provide an improved audio rate converter which can provide the playback audio data at s fixed sampling rate regardless of the sampling rate for the inputted audio data.

In accordance with one aspect of the present invention, an audio rate converter is comprised of a data memory, a memory writing control means, a memory reading control means, coefficient data providing means, and an arithmetic and logic means. The memory writing control means is for writing input audio data into the data memory in accordance with a write address signal synchronized with the input audio data. The memory reading control means is for reading audio data from the data memory in accordance with a read address signal generated in a specified cycle. The coefficient data providing means is for providing coefficient data determined based on a sampling point in output audio data in accordance with the audio data read from the data memory. The arithmetic and logic means is for providing the output audio data by performing an arithmetic and logic operation using the audio data read from the data memory and the coefficient data outputted from the coefficient data outputting means.

For example, an address synchronizing means for performing a synchronizing process for each predetermined cycle is provided which changes the difference between the read address signal and the write address signal to a specified value. Further, during the rate transitional period in which the sampling rate for the input audio data is changed, the address synchronizing means interrupts the synchronizing process.

According to the present invention, the output audio data is generated by the arithmetic and logic operation with the audio data read in a specified cycle from the data memory and the coefficient data is determined based on the sampling point for the output audio data, and this makes it possible to provide the output audio data at a predetermined sampling rate regardless of the sampling rate at which the input audio data was provided. It is possible to transmit data using AES/EBU or SIF by setting the sampling rate for the output audio data, for example, to 48 kHz.

Further, the read address signal is synchronized with the write address signal in each predetermined cycle so as to allow a phase difference between them to be equal to a specified value and this makes it possible to delay the audio data relative to the signal processing for the video data, for example, in the VTR so as to realize "lip synchronization" between the audio and video portions.

Moreover, although the phase relationship of the read address signal and the write address signal can not he guaranteed during rate transitional period at which time the sampling rate for the input audio data is changed, and it was possible for the synchronizing process to cause unwanted noise in the prior art, it is possible to prevent the occurrence of noise by interrupting the synchronization during the rate transitional period.

Additional objects and advantages of the present invention will be apparent from the following detailed description of a preferred embodiment thereof which is best understood with reference to the accompanying drawings.

BRIEF DESCRIPTION OF THE DRAWINGS

FIGS. 5A to 5I are a diagram showing the operation of the read address generator (when there is a 1% increase in speed); and FIGS. 6A to 6I are a diagram showing the operation of the read address generator (when there is a 1% decrease in speed).

DETAILED DESCRIPTION OF THE PREFERRED EMBODIMENT

A preferred embodiment of the present invention is described below in reference to FIG. 1. This embodiment is for providing an output audio data DAout at a sampling rate of 48 kHz in response to the input audio data DAin at a sampling rate of 48 kHz±x%.

Figure 1:
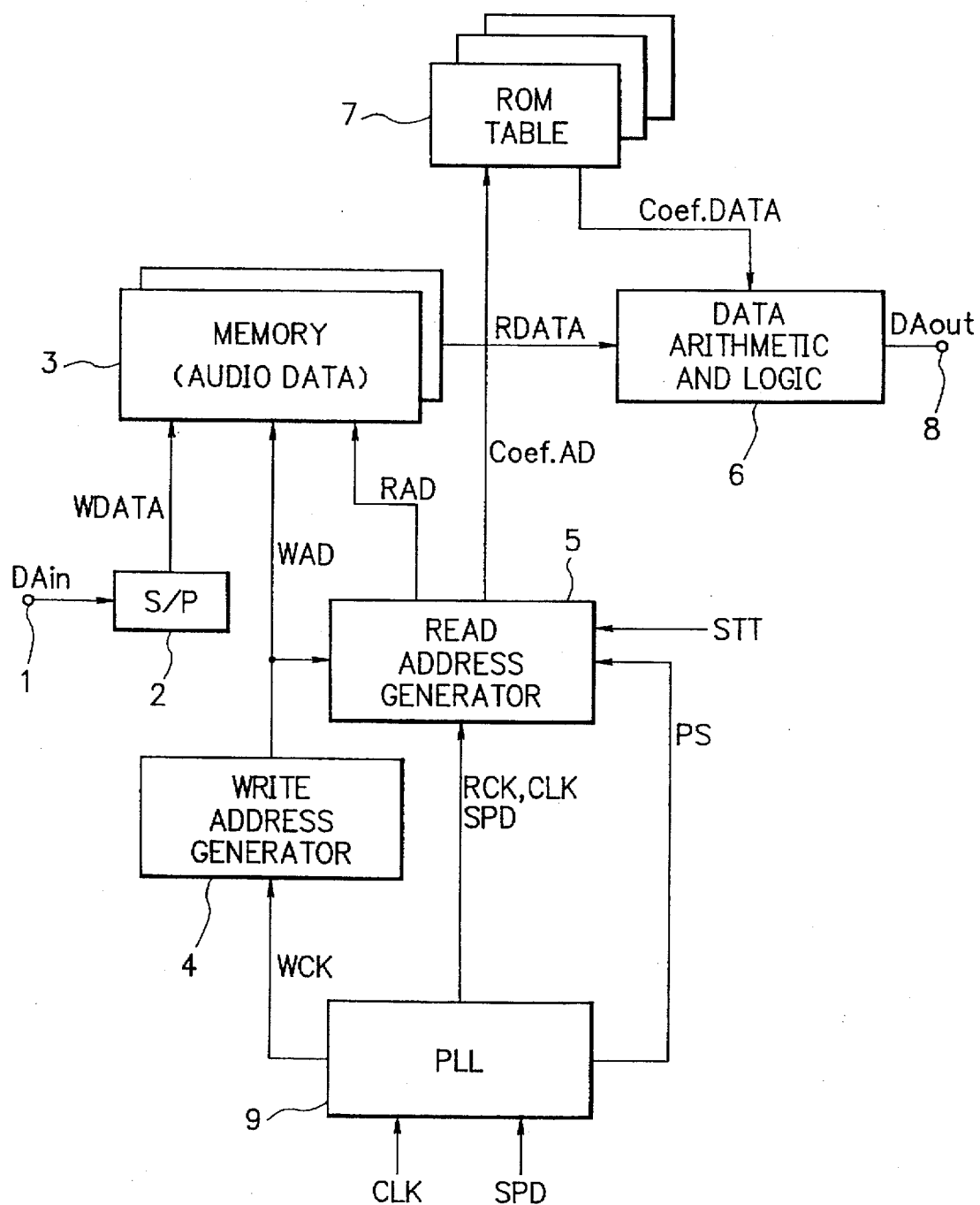
FIG. 1 illustrates, in a block diagram form, an audio rate converter as a preferred embodiment according to the present invention.

In FIG. 1, reference numeral 1 denotes an input terminal, to which input audio data DAin, such as playback audio data (serial data) from the programmed play of the VTR, is supplied. The sampling rate PFS of the audio data DAin is set at 48 kHz±x%. Such audio data DAin supplied at the input terminal 1 is converted into parallel data by a serial/parallel converter 2 and is supplied as write data WDATA to a memory 3.

The memory 3, receiving the write address signal WAD synchronized with the sampling rate PFS from a write address generator 4, writes the data WDATA in accordance with the address signal WAD, while the memory 3, receiving a read address signal RAD synchronized with a sampling rate FS (48 kHz) from a read address generator 5, reads data RDATA in accordance with the read address signal RAD. Such read data RDATA are supplied to a data arithmetic and logic circuit 6.

Reference numeral 7 denotes a ROM table which stores coefficient data. Such ROM table 7, receiving read address signal Coef.AD synchronized with the sampling rate FS from the read address generator 5, reads coefficient data Coef.DATA in accordance with the read address signal Coef.AD. Such coefficient data Coef.DATA are also supplied to a data arithmetic and logic circuit 6.

Figure 2:
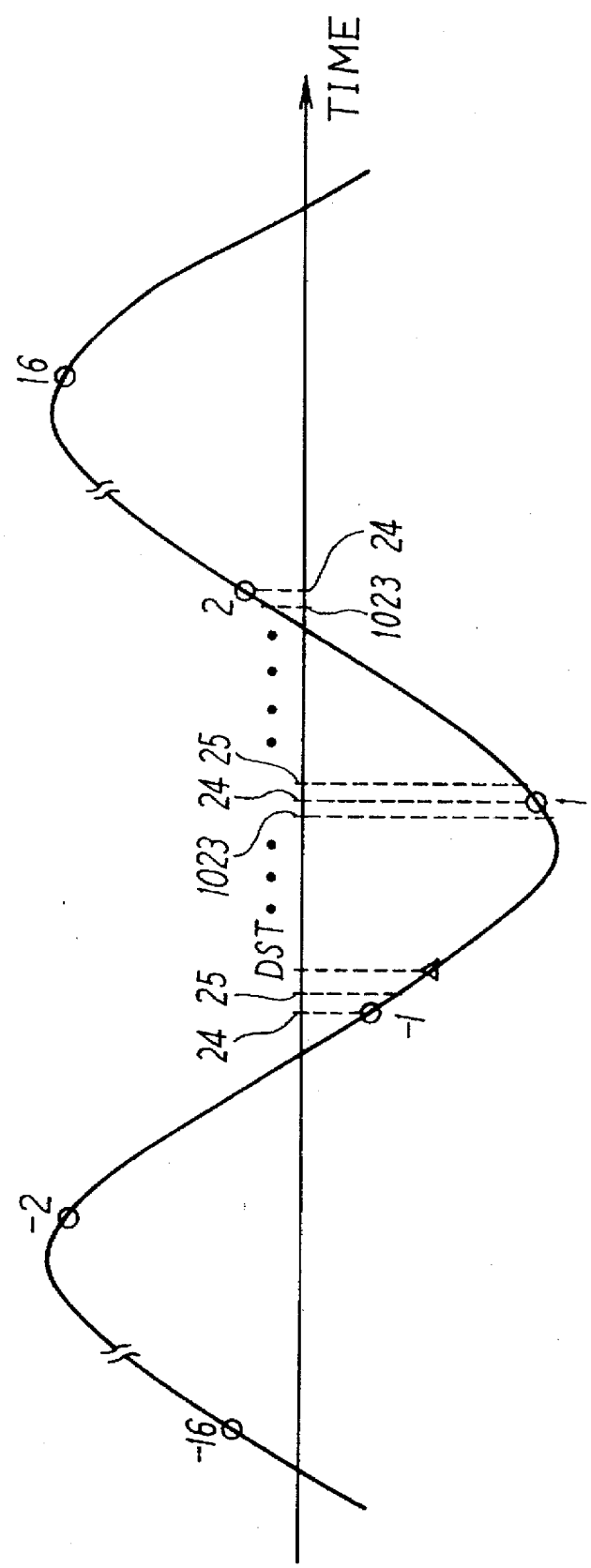
FIG. 2 is a diagram showing an oversampling process.

The data arithmetic and logic circuit 6 performs the oversampling process 32 times, so that 32 samples of audio data composed of input audio data DAin inputted from the memory 3 within 1/FS of time are read successively in cycles of 1/256FS. In this case, as shown in FIG. 2, the 32 samples of the audio data consist of a pair of 16 samples of the audio data which are positioned one (from "−16" to "−1") before and one (from "1" to "16") after a sampling point of the audio data that is to be used as the output audio data (marked with "Δ").

32 items of the coefficient data Coef.DATA are read from the ROM table 7 in a 1/256FS cycle corresponding to each of the 32 samples of the audio data read from the memory 3. The 32 coefficient data Coef.DATA are determined immediately based on the sampling point of the audio data that is used as the output audio data DAout.

The data arithmetic and logic circuit 6 produces the audio data that is used as the output audio data DAout by multiplying successively the audio data read from the memory 3 by the corresponding coefficient data read from the ROM table 7 and by taking the sum of the 32 values produced by multiplication. The data arithmetic and logic circuit 6 outputs the audio data to be included in the output audio data DAout, so that the output audio data DAout are supplied to an output terminal 8 at the sampling rate FS.

Reference numeral 9 denotes a PLL circuit, which receives a reference clock CLK having a frequency of 256FS from a system controller (not shown) and speed data SPD representative of the speed at which the VTR is providing playback. The speed data SPD is set to "1000" in normal playback or to "1000±n" when the playback speed differs from the normal speed in the programmed play. For example, when the playback speed is increased by 1%, the speed data SPD is set to "1010", and when the playback speed is decreased by 1%, the speed data SPD is set to "990".

Figure 3:
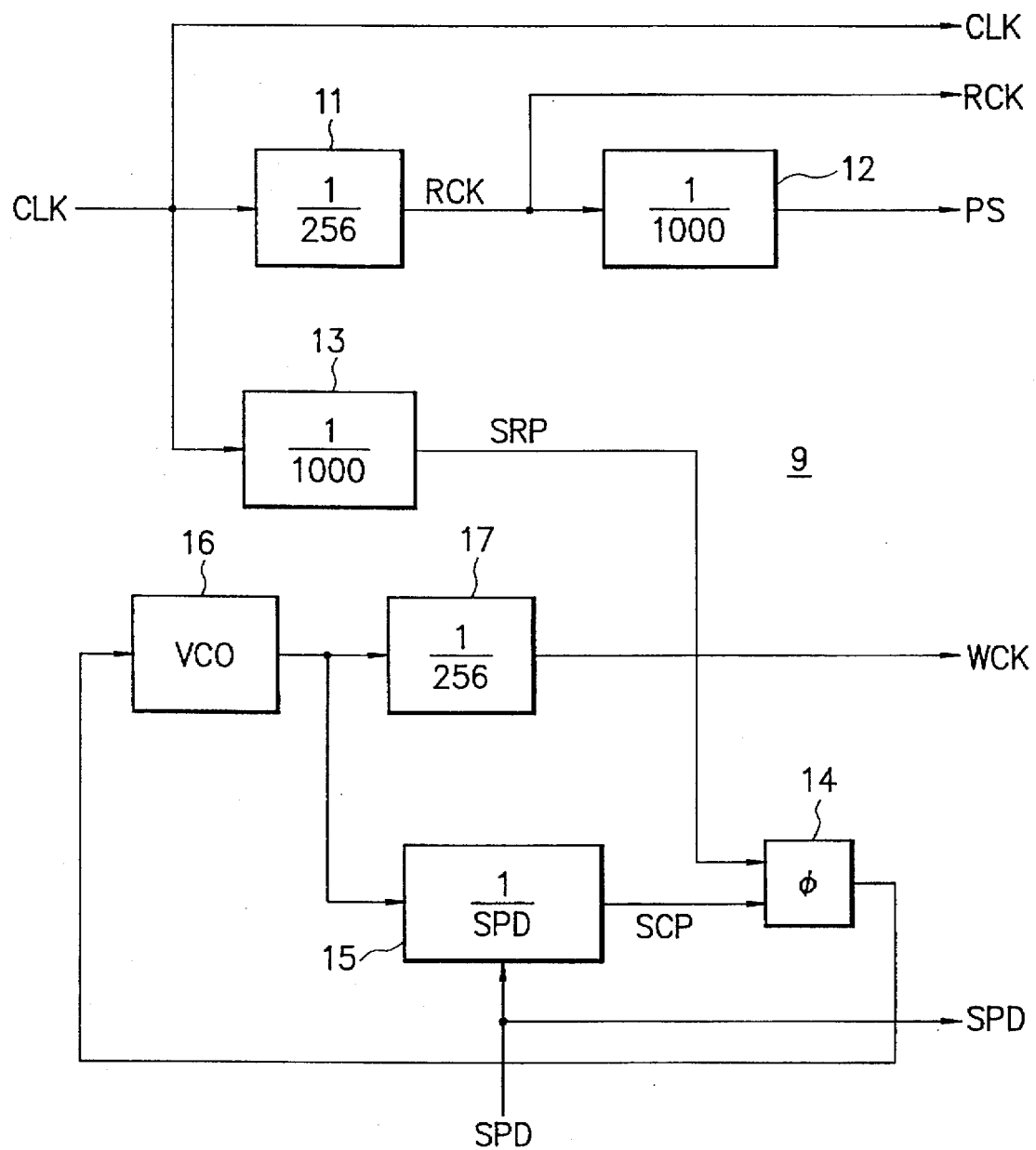
FIG. 3 illustrates, in a block diagram form, a PLL circuit.

FIG. 3 illustrates the actual construction of the PLL circuit 9. Referring to FIG. 3, a divider 11 divides the reference clock CLK into 1/256ths in order to produce a read clock RCK having a frequency equal to FS (48 kHz). A divider 12 divides such read clock RCK into 1/1000ths in order to produce a synchronizing pulse PS having a frequency of FS/1000 (48 Hz). A divider 13 divides the reference clock CLK into 1/1000ths in order to produce a phase comparison signal SRP, which is supplied to a phase comparator 14.

Reference numeral 15 denotes a divider receiving the speed data SPD, the division ratio of which is set to 1/SPD. This divider 15 also divides an output from a voltage control oscillator 16 and supplies the output to the phase comparator 14. A comparison output signal from the phase comparator 14 is supplied as an control signal to the voltage control oscillator 16. Such phase lock loop between phase comparator 14, the divider 15, and the voltage control oscillator 16 allows the phase comparison signal SCP outputted from the divider 15 to be equal in phase and in frequency to the phase comparison signal SRP outputted from the divider 13.

In such construction, the frequencies of the phase comparison signal SRP and SCP are set to 256FS/1000 (12.288 kHz), so that the output from the voltage control oscillator 16 has a frequency equal to 256 times of the sampling rate PFS (48 kHz±x%) at which the input audio data DAin are sampled. A divider 17 divides such output signal from the voltage control oscillator 16 into 1/256ths in order to produce a write clock WCK having a frequency equal to PFS (48 kHz±x%).

The PLL circuit 9 having the construction described above is controlled so as to lock the phases of the phase comparison signals SRP and SCP. The phase comparison signal SRP outputted from the divider 13 which is 1/1000th of the reference clock CLK, is locked in phase with the synchronizing pulse PS which is 1/1000th of 1/256th of the reference clock CLK. In other words, the synchronizing pulse PS is locked in phase regularly in relation to the reference clock CLK and to the output signal from the voltage control oscillator 16.

Referring to FIG. 1, the write clock WCK outputted from the PLL circuit 9 is provided to the write address generator 4. At the write address generator 4 the above-described write address signal WAD is generated, synchronized with the write clock WCK. The read address generator 5 receives the read clock RCK, the reference clock CLK, the speed data SPD, and the synchronizing pulse PS, outputted from the PLL circuit 9, the write address signal WAD outputted from the write address generator 4, and a rate conversion transitional signal STT outputted from the system controller (not shown) which is increased to a high level "H" in accordance with a rate transitional period (the period in which the playback speed, and accordingly, the speed data SPD, is changing), and generates the read address signals RAD and Coef.AD described above.

Figure 4:
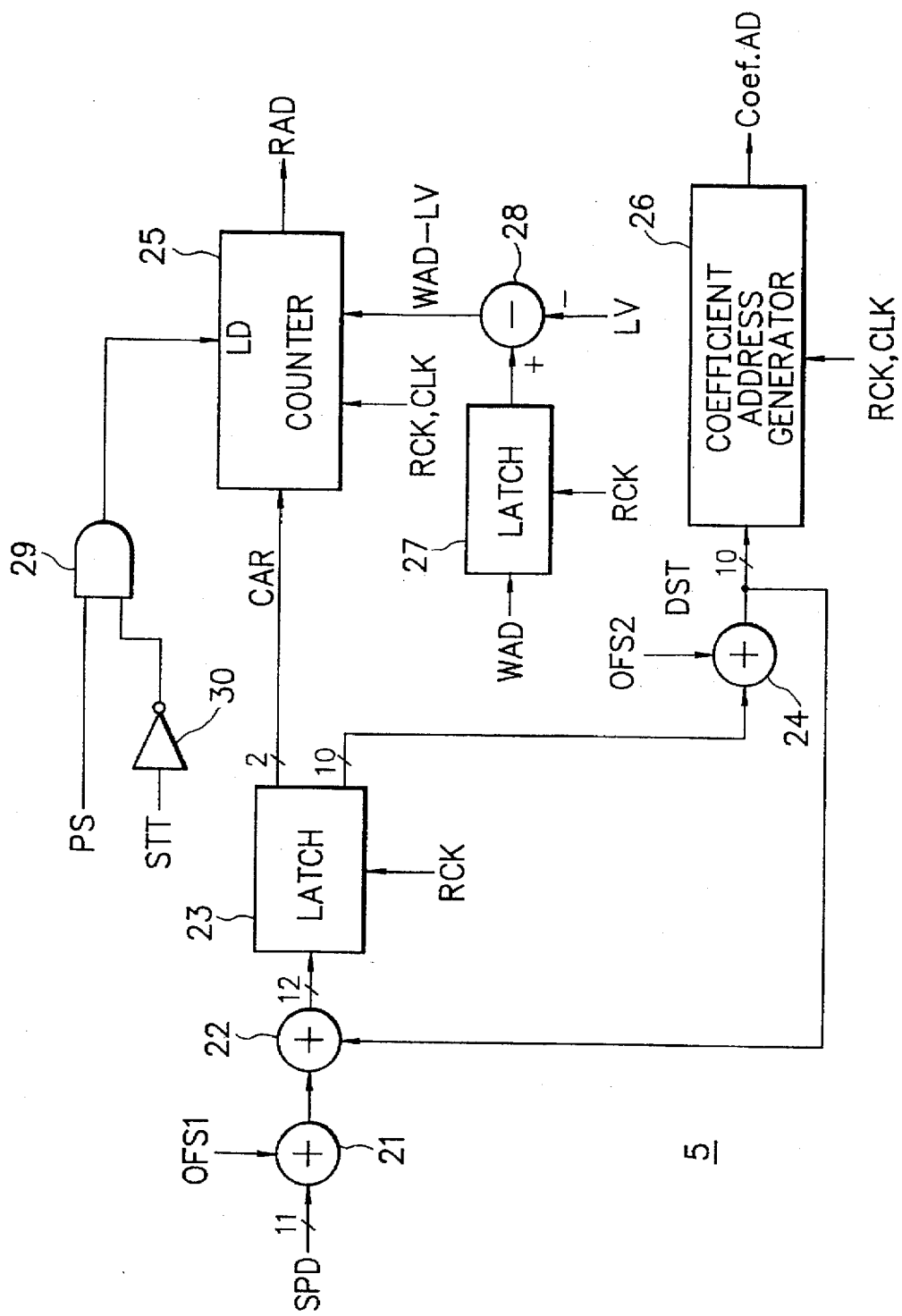
FIG. 4 illustrates, in a block diagram form, a read address generator.

FIG. 4 illustrates the actual construction of the read address generator 5. In FIG. 4, an adder 21, receiving the speed data SPD as 11-bit parallel data, adds an offset OFS1 to it, and provides the data as 12-bit data to a latch circuit 23. The latch circuit 23, receiving the read clock RCK having a frequency equal to FS (48 kHz) as a latch pulse, latches the 12-bit data at the point at which the voltage of the latch pulse drops. Of the 12-bit data, the first portion of 2 bits is a carry data CAR, and the second portion of 10 bits added to an offset OFS2 by an adder 24 is the distance data DST which is supplied to the adder 22.

The offset OFS1 is changed in relation to the playback speed. In other words, when the playback speed is faster than the normal (SPD>1000), the OFS1 is set to "24". When the playback speed is slower than normal speed (SPD<1000), the offset OFS1 is set to "0". The offset OFS2 is changed in relation to the playback speed and the carry data CAR. In other words, with playback faster than the normal, when the carry data CAR is set to "1" the OFS2 is set to "0", while when the carry data CAR is set to "2" the OFS2 is set to "24". On the other hand, with playback slower than the normal speed, when the carry data CAR is set to "1" the OFS2 is set to "24", while when the carry data CAR is set to "0" the OFS 2 is set to "0".

2 bits of the carry data CAR outputted from the latch circuit 23 are supplied to a counter 25 which provides the read address signal MAD. In such case, when the carry data CAR equals "0", "1", or "2", an incremental operation is performed by the counter 25 at a point at which the voltage of the read clock RCK drops, in order to allow the 32 samples of audio data included in the input audio data DAin read from the memory 3 (shown in FIG. 1) to shift by zero, one or two samples. The counter 25 successively outputs the read address signal RAD for the 32 samples during each cycle of the read clock RCK using the cycles of the reference clock CLK.

When the distance between each sampling point for the input audio data DAin is divided into 1000 equal parts, and is expressed as, "24" to "1023", the distance data DST outputted from the adder 24 indicates the sampling point (marked with "Δ" in FIG. 2) of the audio data that is to be used as the output audio data DAout. Since the positional relationship of the 32 samples of audio data for the input audio data DAin is determined by the distance data DST, the coefficient data Coef.DATA, which corresponds to each of such 32 samples of audio data, is immediately determined. The distance data DST is supplied to a coefficient address generator 28, and is synchronized with the audio data outputted from the memory 3. The items of read address signal Coef.AD are successively outputted during each cycle of the read clock RCK using the cycles of the reference clock CLK.

FIGS. 5A to 5I illustrate an operation of the read address generator 5 when the speed is increased by 1%. FIG. 5A is the read clock RCK, FIG. 5B is the speed data SPD, FIG. 5C is the output data from the adder 21, FIG. 5D is the output data from the adder 22, FIG. 5E is the 10-bit data outputted from the latch circuit 23, FIG. 5F is the carry data CAR outputted from the latch circuit 23, FIG. 5G is the distance data DST outputted from the adder 24, FIG. 5H is the offset OFS1, and FIG. 5I is the offset OFS2.

In this case, the distance data DST synchronized with the read clock RCK changes from "24" to "34" to "44" and so on to "1014", and then back to "24" and so on. Although the 32 samples of the audio data of the input audio data DAin are basically shifted by one sample in relation to the change of the distance data DST (CAR="1"), they are shifted by two samples when the distance data DST shifts from "1014" to "24". This is because when the distance data DST shifts from "1014" to "24", the sampling point of the audio data that is to be used as the output audio data DAout shifts two points past the sampling point of the output audio data DAin.

FIGS. 6A to 6I illustrate an operation of the read address generator 5 when the speed is decreased by 1%. FIGS. 6A to 6I respectively correspond to data in FIGS. 5A to 5I. In this case, the distance data DST synchronized with the read clock RCK changes from "1023" to "1013" to "1003" and so on to "33", and then back to "1023" and so on. Although the 32 samples of the audio data of the input audio data DAin are basically shifted by one sample in relation to the change of the distance data DST (CAR="1"), they are inhibited from being shifted when the distance data DST is shifted from "33" to "1023" (CAR="0"). This is because when the distance data DST shifts from "33" to "1023", the sampling point of the audio data that is to be used as the output audio data DAout shifts so as not to skip over the sampling point of the input audio data DAin.

Referring to FIG. 4, the write address signal WAD is supplied to the latch circuit 27, which receives the read clock RCK as a latch pulse and latches the write address signal WAD at a point at which the voltage of the pulse drops. A subtractor 28 subtracts a specified value LV from the write address signal WAD latched in the latch circuit 27, and provides load data given from the result to the counter 25. The specified value LV is set equally to, for example, an address interval of the memory 3 which corresponds to a delay time by signal processing for video data (for example, a 4-field period) in the VTR.

The synchronizing pulse PS is supplied to the AND gate 29, which also receives a rate transitional signal STT as a gate control signal via an inverter 30. At times other than rate transitional periods, because the rate transitional signal STT is set to a low level "L", the synchronizing pulse PS is supplied as a load pulse to the counter 25 via the AND gate 29. At such times, the load data (WAD-LV) outputted as the read address data RAD from the subtractor 28 is loaded. On the other hand, because the rate transitional signal SST is set to a high level "H" during rate transitional periods, the synchronizing pulse PS is not supplied to the counter 25, and the loading operation described above is not undertaken. In addition, the 32 samples of the audio data which comprise the input audio data DAin are read from the memory 3 as described above during 1/FS of time, and the load data (WAD-LV) are used as the read address for the first sample of audio data.

As described above in the embodiment, the output audio data DAout at the sampling rate of FS (48 kHz) can be provided at the output terminal 8, when the input audio data DAin at the sampling rate of PFS (48 kHz±x%) is supplied at the input terminal 1. Accordingly, it is possible to transmit data using AES/EBU or SIF in the programmed play of the VTR by setting the sampling rate for the output audio data DAout to 48 kHz.

Further, in this embodiment, as shown in FIG. 4, the load data (WAD-LV) outputted from the subtractor 28 is loaded as the read address data RAD into the counter 25 in the read address generator 5, and the read address signal RAD is synchronized with the write address signal WAD so as to be delayed exactly by the specified value LV using the synchronized pulse PS for each 48 Hz. This enables "lip synchronization" between the audio and video to be maintained by setting a specified value LV between the addresses in the memory 3 that correspond to the time delay resulting from the signal processing for video data using the VTR.

Moreover, because the PLL circuit 9 is not locked in phase during the rate transitional period, the phase relationship between the read address signal WAD and the write address signal RAD is not guaranteed and this leads to the possibility of noise due to interruption of the output audio data DAout due to the synchronizing process. But in this embodiment, the synchronizing process is stopped because the synchronizing pulse PS is not supplied to the counter 25 during the rate transitional period; thus the occurrence of noise is prevented.

It is to be understood that PFS (48 kHz±x%) and FS (48 kHz) are examples and are not intended to limit the scope of the present invention.

According to the present invention, since the audio data read at specified cycles from the data memory is processed using the arithmetic and logic operation with the coefficient data determined based on the sampling point for the output audio data and the output audio data are obtained, it is possible to obtain output audio data at the specified sampling rate regardless of a sampling rate for the input audio data. For example, by setting the sampling rate for the output audio data to 48 kHz, it is possible to transmit data using the AES/EBU or the SIF.

Further, the read address signal is synchronized with the write address signal for each specified cycle so that there is a phase difference between them set at a specified value, and this makes it possible to delay the audio data relative to the signal processing for the video data, for example, in the VTR so as to realize "lip synchronization" between the audio and video portion.

Moreover, although the phase relationship between the read address signal and the write address signal is not guaranteed during the rate transitional period, during which time the sampling rate at which the input audio data are provided is changing, and synchronization may cause noise under the prior art, it is possible to prevent noise by interrupting the synchronization during the rate transitional period.

It will be obvious to those having skill in the art that many changes may be made in the above-described details of the preferred embodiment of the present invention. The scope of the present invention, therefore, should be determined by the following claims.

What is claimed is:

1. A synchronous audio rate converter, comprising:

a data memory;

means for generating a clock signal;

memory writing control means for writing input audio data into said data memory in accordance with a write address signal synchronized with said input audio data;

memory reading control means for reading audio data from said data memory at a fixed rate in accordance with a read address signal generated in specified cycles of said clock signal;

coefficient data output means for outputting coefficient data determined according to a sampling point in output audio data corresponding to said audio data read from said data memory; and arithmetic and logic processing means for obtaining said output audio data by performing an arithmetic and logic operation using said audio data read from said data memory and coefficient data outputted from said coefficient data output means.

2. The audio rate converter in accordance with claim 1 further comprising address synchronizing means for synchronizing said read address signal with said write address signal at each predetermined time so that a phase difference between said read address signal and said write address signal has a specified value.

3. The audio rate converter in accordance with claim 2 wherein said address synchronizing means halts said synchronizing operation during a rate transitional periods, at which a sampling rate for said input audio data is changing.

* * * * *